United States Patent Office 3,093,653
Patented June 11, 1963

3,093,653
HETEROCYCLIC PRODUCTS FROM CYANOGEN AND CYANIDES AND PROCESS
Owen W. Webster, Wilmington, Del., assignor to E. I. du Pont de Nemours and Company, Wilmington, Del., a corporation of Delaware
No Drawing. Filed Mar. 1, 1961, Ser. No. 92,462
21 Claims. (Cl. 260—299)

This invention relates to, and has as its principal objects, the provision of a new reaction of cyanogen, the products thereby obtained and selected derivatives of said products.

Cyanogen has been known for a long time, but until recently its uses have been quite limited. Although cyanogen is relatively stable at ordinary temperatures, it reacts readily with compounds containing active hydrogen, e.g., with primary amines to form oxamidines. It reacts with itself at elevated temperautres to give an insoluble and inert polymer, called paracyanogen. In the presence of an alkali metal cyanide at 440° C., cyanogen was also shown by Perrett et al., Bull. soc. chim. (4), 51, 626 (1932), to produce paracyanogen.

It has now been found that cyanogen reacts with an alkali metal cyanide (MCN) in an inert polar solvent to give the new compound $MC_7N_7$ wherein M is the alkali metal. The latter new compounds can be reacted with metal salts, acids or organic halides thereby replacing the alkali metal cation with other metals, hydrogen or organic cations, respectively, to give further derivatives of the $C_7N_7$ radical. These new products are unique in that they are stable and have substantially no tendency to form higher or lower molecular weight products by polymerization or decomposition. Spectral data indicate the cyano groups present in the new products of this invention are similar and are conjugated, i.e., the α-carbon has a double bond. Alkylation causes a small hypsochromic shift and decrease in intensity in ultraviolet light.

The properties of the new compounds of this invention are explained by the structure

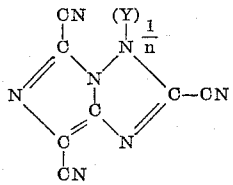

wherein Y is an alkali metal (M); ammonium, tetraalkylammonium or a metal other than M (Q); hydrogen (H); or hydrocarbon (R) and n is the formal valence of Y. However, isomeric structures (including tautomers) have not been entirely excluded because the best method of characterizing the new materials of this invention is by their atomic ratio and spectrometric properties which show the presence of carbon-to-nitrogen unsaturation.

The reaction of cyanogen with an alkali metal cyanide, MCN, in an inert medium, as described, produces the $MC_7N_7$ as illustrated by the equation $$3(CN)_2 + MCN \rightarrow M(C_7N_7)$$

In this reaction the alkali metal cyanides are those of metals having an atomic number of at least 11 and preferably not over 55. Included are sodium, potassium, rubidium and cesium cyanide. Of these, potassium and sodium are most available and preferred. The inert polar solvent is one that dissolves, but does not react with, the cyanogen at the temperatures employed. It is non-protonic, i.e., it does not contain active hydrogen as in amines, alcohols, or water. It is preferred that it be liquid at the temperatures generally employed. Very high boiling liquids, i.e., boiling above 200° C., are not preferred since their removal from the reaction product may require additional steps. Particularly preferred are acetonitrile, propionitrile, benzonitrile, tetrahydrofuran, dimethylformamide, dimethylacetamide, dimethoxyethane, and the dimethyl ether of diethylene glycol.

The reaction temperature and pressure are such that the cyanogen (M.P. —28° C., B.P. —21° C.) and solvent are in the liquid phase. Although extremely low temperatures, or temperatures up to 125° C. at a pressure of about 60 atmospheres, can be employed, it is preferable to use a temperature of —50° C. to 50° C. and a pressure of up to about 10 atmospheres to eliminate the need for special heating and pressure-resistant equipment.

On the basis of the above equation, the ratio of reactants on a molar basis should be 3 of cyanogen to 1 of the alkali metal cyanide. Higher or lower ratios, e.g., 10:1 to 1:1, can be used but are less preferred.

The alkali metal in the $MC_7N_7$ product can be replaced by other metals, ammonium, substituted ammonium, hydrogen or hydrocarbon by simple ionic replacement reactions. The conditions employed in these reactions are those generally employed in ionic replacements and as such would be evident to the skilled chemist. Thus, the alkali metal cation may be replaced by other metals by reacting $MC_7N_7$ with an ionizable metal salt in a mutual inert solvent for both compounds. For example, the cation can be replaced by lead, mercury, magnesium, calcium, barium, chromium, manganese, iron, cobalt, nickel, copper, zinc, palladium, platinum, or tin by treatment of the $MC_7N_7$ with a suitable salt, e.g., lead nitrate, mercuric chloride, magnesium chloride, calcium chloride, barium chloride, chromic chloride, managnous nitrate, ferric chloride, cobaltous nitrate, nickel chloride, cupric nitrate, zinc nitrate, palladium chloride, platinum chloride, or stannous chloride, respectively.

A particularly interesting substitution that can be made for the alkali metal cation is of an ammonium radical or a tetraalkylammonium radical in which each alkyl group preferably contains up to six carbons. This ionic replacement is effected in the same manner as with the metals in the preceding paragraph, i.e., by reacting $MC_7N_7$ with an ammonium or tetraalkylammonium salt under well known ionic replacement reaction conditions. For example, M may be replaced by ammonium, tetramethylammonium, tetrabutylammonium or tetrahexylammonium by treatment of $MC_7N_7$ with a suitable salt of these respective cations, preferably their halides.

The new compounds thus obtained by reaction of $MC_7N_7$ with metal, ammonium or tetraalkylammonium salt can be represented by the generic formulas $$Q(C_7N_7)_n$$

or

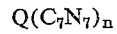

wherein n is the formal valence of Q, the latter representing the cation.

Acidification of metallic or ammonium salts of the $C_7N_7$ anion by common prior art techniques gives the corresponding $HC_7N_7$ compound. Also, alkylation of any of the metal salts, e.g., by treatment with hydrocarbon halides, RX, wherein R is a hydrocarbon radical of from 1 to 8 carbon atoms, gives the corresponding hydrocarbon derivatives, $R(C_7N_7)_n$, wherein n is the formal valence of R. For example, benzyl chloride, cyclohexyl chloride, butyl bromide, octyl chloride, allyl chloride, methyl iodide, and ethyl iodide react with an alkali metal salt of the C₇N₇ anion to give the corresponding benzyl, cyclohexyl, butyl, octyl, allyl, methyl, and ethyl derivatives. Reaction of a dihalide, e.g., trimethylene dibromide, with KC₇N₇ gives the corresponding

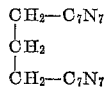

compound wherein the C₇N₇ radicals are unchanged.

The following examples further illustrate this invention.

Example I
PREPARATION OF KC₇N₇

(a) *Low initial temperature.*—A solution of 8.5 g. of cyanogen (B.P. —21° C.) in 100 ml. of acetonitrile was cooled to —40° C. under a nitrogen atmosphere. Dry powdered potassium cyanide (7.16 g.) was added in one portion. The mixture was stirred one hour at —40° C., was allowed to warm to room temperature, and then was filtered. The filtrate was diluted with 100 ml. of dry ether and was refiltered. The filtrate from the second filtration was diluted with one liter of ether. KC₇N₇ (12.1 g.) crystallized. The product was recrystallized from dioxane-acetonitrile. Heating at 144° C./0.3 mm. was necessary to completely remove the solvated dioxane.

*Analysis.*—Calcd. for KC₇N₇: C, 38.1; N, 44.8; M.W., 110.5. Found: C, 37.76; N, 31.23; M.W. (by 37.04 acetonitrile B.P.), 115–116.

In general, it is difficult to obtain nitrogen analyses on C₇N₇⁻ compounds probably due to nitride formation with metals. The infrared spectrum of KC₇N₇ contained absorption bands at 4.47, 6.40, 6.81, 7.05, 7.25, 7.65, 8.25, 8.40, 10.00, 13.50μ. Of these, the ones at 4.47μ and 6.40μ indicate the presence of —C≡N and >C=N— groupings.

In a similar manner, a larger amount of this new product was prepared as follows:

To a stirred, cooled (—40° C.) solution of cyanogen (56 g.) in dry acetonitrile (250 ml.) maintained under a small positive pressure of nitrogen was added freshly precipitated and dried potassium cyanide (26.12 g.). A deep red coloration appeared on adding the potassium cyanide. The mixture was stirred for one hour during which time the temperature was allowed to rise to 25° C. An exothermic reaction occurred as evidenced by warming of the flask. After three hours' stirring at 25° C. the mixture was filtered to remove excess potassium cyanide. The black-brown filtrate was treated with 2 liters of ether to effect precipitation of a brown flocculent solid. Filtration gave a clear orange filtrate leaving a brown solid which turned black on exposure to moisture and air. The filtrate was concentrated at reduced pressure to leave an orange-yellow solid. Trituration with ether and filtration gave, after drying under nitrogen, 70.9 g. (89.5%) of KC₇N₇ as an orange solid. This product was recrystallized twice from a hot mixture of acetonitrile (1 part) and dioxane (4 parts) to give 85.8 g. of C₇N₇K combined with two molecules of dioxane of crystallization. Samples dried at 144° C. (boiling xylene) in vacuum showed a weight loss of 44.5% (calc. for C₇N₇K·2 dioxane, 44.3%) and a M.P. 325–332° C.

(b) *Room temperature.*—A solution of 5.5 g. of cyanogen in 50 ml. of acetonitrile was treated with 3.1 g. potassium cyanide at room temperature under nitrogen. The solution warmed to its boiling point with the loss of some of the cyanogen. The mixture was filtered and the filtrate diluted with 500 ml. of ether. There was obtained 3 g. of crystalline KC₇N₇ which was identified by its infrared spectrum.

The hydrolytic stability of this salt was demonstrated by refluxing in water for 18 hours. The starting material was recovered unchanged.

Example II
(CH₃)₄NC₇N₇

Treatment of a few grams of KC₇N₇ (see Example I) with excess of a saturated solution of Me₄NBr in water caused the precipitation of (CH₃)₄NC₇N₇. This product was recrystallized from water.

*Analysis.*—Calcd. for C₈H₁₂N₈: C, 51.55; H, 4.73. Found: C, 52.13; H, 5.30.

Example III
(C₂H₅)₄NC₇N₇

To a solution of 4 g. of KC₇N₇·2 dioxane in 10 ml. of water was added a solution of 5 g. of tetraethylammonium bromide in 10 ml. of water. The mixture was heated on the steam bath and 30 ml. of water and enough acetonitrile to effect solution added. The hot solution was treated with decolorizing activated charcoal, filtered and the filtrate cooled. The long transparent needles were collected on a filter and air dried to give 2.63 g. (90%) of (C₂H₅)₄NC₇N₇; M.P. 220–222° C.

*Analysis.*—Calcd. for C₁₅H₂₀N₈: C, 57.67; H, 6.45; N, 35.88; M.W., 312. Found: C, 58.04, 58.00; H, 6.55, 6.44; N, 35.59, 35.35; M.W. (B.P. methylene chloride), 314, 320.

The infrared spectrum shows a triplet in the nitrile region (medum 4.6μ, stronger at 4.44, strongest at 4.52) and a strong peak at 6.43 characteristic of >C=N— absorption. The ultraviolet spectrum displays maxima at 314 mμ (ε=16,900), 287 mμ (ε=12,400), and 220 mμ (ε=31,500).

An intimate mixture of 1.5 g. of the above salt with 1.5 g. of potassium perchlorate was packed in a 3 mm. by 50 mm. paper tube sealed at one end. After placing on an inclined surface, the open end was ignited by a gas burner. The tube was propelled from the plane by the reaction of this solid fuel mixture, demonstrating utility as an ingredient in a propellant.

In this and the following examples where KC₇N₇·2 dioxane is a reactant, this salt containing dioxane of crystallization is used only as a matter of convenience. If desired, the dioxane can be removed by heating, as in Example I(a), prior to performance of the ionic replacement reaction.

Example IV
HC₇N₇

KC₇N₇·dioxane (1.7 g.) was dissolved in 50 ml. of acetonitrile and 0.7 ml. of concentrated hydrochloric acid was added. Potassium chloride (0.29 g.) was removed by filtration and the filtrate was evaporated. On trituration with ether, the residue gave 0.65 g. of HC₇N₇. The product decomposed at about 145° C. The infrared spectrum was similar to that of KC₇N₇ with bands at 3.30, 4.45, 6.15, 6.79, 7.10, 7.27, 7.54, 8.27, 9.48, 10.00, and 12.50μ. Of these, those at about 4.45μ and 6.14μ indicated the presence of —C≡N and >C=N— groups.

Example V
CH₃C₇N₇

To a solution of KC₇N₇ (1.0 g., 0.0045 mole) (previously dried at 144° C. in vacuo) in dry acetonitrile (20 ml.) was added methyl iodide (10 ml.) and the mixture heated at reflux with stirring under nitrogen. Additional 4 ml. portions of methyl iodide were added at the end of 2, 18, and 48 hours. After 63 hours the mixture was collected and filtered, the residue washed with a small amount of acetonitrile and dried on the funnel under nitrogen to leave 0.2044 g. of potassium iodide. The filtrate was concentrated at reduced pressure to leave a yellow solid. This residue was slurried twice with 10 ml. portions of tetrahydrofuran, the residue collected on a filter and dried to leave 0.5226 g. of potassium iodide. The yield of potasisum iodide (0.727 g.) equalled 97% yield based on KC₇N₇. The tetrahydrofuran was concentrated at reduced pressure to give a yellow solid, which after recrystallization from tetrahydrofuran-chloroform gave 0.735 g. (82.3%) of $CH_3C_7N_7$ as pale yellow needles, M.P. 216–222° C. Sublimation (165° C. at 1 mm.) gave a colorless product, M.P. 216–222° C., leaving 10 mg. of a buff-colored residue, which was recrystallized from methyl ethyl ketone, M.P. 232.8–235° C.

*Analysis.*—Calcd. for $C_8H_3N_7$: C, 48.70; H, 1.55; N, 49.75; M.W., 197. Found: C, 49.28, 49.19; H, 1.57, 1.60; N, 49.19, 49.27; M.W., 173, 166.

This methyl derivative shows an infrared peak at $4.48\mu$ (conjugated nitrile) and at $6.2\mu$ (C=N—). The ultraviolet spectrum had bands at 308 m$\mu$ ($\epsilon$=6,050), 265 m$\mu$ ($\epsilon$=13,900), and 223 m$\mu$ ($\epsilon$=22,600).

The methylated compound was hydrolyzed to the corresponding triamide as follows:

To 10 ml. of cold concentrated hydrochloric acid contained in a small flask was added $CH_3C_7N_7$ (0.65 g.) and the mixture vigorously stirred for 18 hours. The mixture was diluted with water (10 ml.), filtered and the residue slurried with 95% alcohol and ether. The crude hydrolysate (0.90 g.) was then heated in dimethylformamide (25 ml.) on the steam bath and filtered. After drying, 0.63 g. (78.5%) of the triamide, M.P. above 350° C., was obtained as a white microcrystalline solid.

*Analysis.*—Calcd. for $C_8H_9N_7O_3$: C, 38.20; H, 3.58; N, 39.05. Found: C, 38.62, 38.61; H, 3.76, 3.53; N, 37.81, 38.09.

The infrared spectrum of the hydrolyzed product showed no nitrile absorption but had a peak at $6.2\mu$, characteristic of amide groups.

*Example VI*

$C_6H_5CH_2—C_7N_7$

A total of 3.38 g. of $KC_7N_7$ (Example I) dissolved in 25 ml. of 1,2-dimethoxyethane and 10 ml. of benzyl chloride was added. The mixture was heated at reflux with stirring for 122 hours. The mixture was cooled and filtered to give 1.09 g. of potasium chloride. The filtrate was concentrated at reduced pressure. The residue was dissolved in 20 ml. of chloroform and then treated with ether to effect crystallization. Filtration gave 3.0 g. of crude benzyl derivative as white needles, M.P. 149–152° C., after crystallization from benzene/hexane. Infrared was in agreement with the structure assumed for $C_7N_7$ group (i.e., having peaks at 4.48 and $6.2\mu$).

*Analysis.*—Calcd. for $C_{14}H_7N_7$: C, 61.53; H, 2.58; N, 35.89. Found: C, 61.19, 61.17; H, 2.61, 2.54; N, 35.15, 35.60.

*Example VII*

SILVER SALT OF $C_7N_7^-$

To a solution of $KC_7N_7 \cdot 2$ dioxane (7.94 g.) in 20 ml. of distilled water was added a solution of 4 g. of silver nitrate in 20 ml. of distilled water. The white precipitate that formed was collected on a filter. The white solid was dissolved in a minimum amount of hot acetonitrile and then water added until crystallization started. After cooling and filtration, 3.12 g. (54%) of $AgC_7N_7$ was obtained as minute white needles.

*Example VIII*

PREPARATION OF $NaC_7N_7$

To a solution cooled to −40° C. of 100 ml. of acetonitrile containing 16.4 g. of cyanogen was added 4.9 g. of sodium cyanide. The mixture was allowed to warm to 25° C. over two hours and then stirred at the latter temperature for 15 hours. The solution, deep brown in color, was then concentrated at reduced pressure giving $NaC_7N_7$ as a dark brown solid.

The $NaC_7N_7$ was dissolved in 100 ml. water and a solution of 20 g. of tetraethylammonium chloride in 20 ml. of water was added. The buff precipitate was filtered and recrystallized from aqueous acetonitrile to give 11.6 g. of the tetraethylammonium salt of $C_7N_7$. The latter salt was identical to that as obtained in Example III.

The products of this invention have the grouping $C_7N_7$ in which the three cyano (CN) groups are attached to carbon carrying a double bond, i.e., have double bond unsaturation conjugated with each cyano group.

Directly available by reaction of cyanogen and sodium, potassium, rubidium, or cesium cyanide in an inert polar solvent are the corresponding sodium, potassium, rubidium, and cesium salts of the $C_7N_7$ anion. Reaction of these salts as heretofore described yields other salts or organic derivatives. The solubility, etc., of the metal salts and organic derivatives differ.

The salts, for example, can be used as adjuvants in plating baths, e.g., 0.01 to 1% solution of them in aqueous baths can be employed for deposition of metals by use of electric current. As shown in Example III, the compounds of this invention are useful in the preparation of propellant compositions. It general, the alkali metal salts are preferred for admixture with an oxidizing agent since they are stable under conditions short of ignition, which is generally above 200° C. Oxidizing agents include chlorates, perchlorates, nitrates, etc. Generally weight ratios of between 1:10 to 10:1 of the new cyano compound to oxidizing agent are used.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula $Y(C_7N_7)_n$, wherein Y is selected from the class consisting of hydrogen, metal, ammonium, tetraalkylammonium wherein each alkyl group contains up to 6 carbon atoms, and monovalent and divalent hydrocarbon of from 1–8 carbon atoms and $n$ is the formal valence of Y, the radical $C_7N_7$ containing three

groups and being such that $KC_7N_7$ is a hydrolytically stable orange solid which melts at 325–332° C. and has an infrared spectrum which contains absorption bands at 4.47, 6.40, 6.81, 7.05, 7.25, 7.65, 8.25, 8.40, 10.00 and $13.50\mu$.

2. The compound of claim 1, wherein Y is potassium.
3. The compound of claim 1 wherein Y is sodium.
4. The compound of claim 1 wherein Y is silver.
5. The compound of claim 1 wherein Y is $(CH_3)_4N—$.
6. The compound of claim 1 wherein Y is $(C_2H_5)_4N—$.
7. The compound of claim 1 wherein Y is hydrogen.
8. The compound of claim 1 wherein Y is methyl.
9. The compound of claim 1 wherein Y is benzyl.
10. The process which comprises reacting cyanogen with MCN, wherein M is an alkali metal of atomic number 11–55, in the liquid phase in a non-protonic, inert polar solvent.
11. The process of claim 10 wherein M is potassium.
12. The process of claim 10 wherein M is sodium.
13. The process which comprises reacting cyanogen with MCN, wherein M is an alkali metal of atomic number 11–55, in the liquid phase in a non-protonic, inert polar solvent and reacting the product thus obtained with a salt of a member selected from the class consisting of ammonium, tetraalkylammonium wherein each alkyl group contains up to 6 carbon atoms, and a metal other than M.
14. The process of claim 13 wherein the salt is silver nitrate.
15. The process of claim 13 wherein the salt is tetramethylammonium bromide.
16. The process of claim 13 wherein the salt is tetraethylammonium bromide.
17. The process which comprises reacting cyanogen with MCN, wherein M is an alkali metal of atomic number 11–55, in the liquid phase in a non-protonic, inert polar solvent and acidifying the product thus obtained.

18. The process which comprises reacting cyanogen with MCN, wherein M is an alkali metal of atomic number 11–55, in the liquid phase in a non-protonic, inert polar solvent and reacting the product thus obtained with a compound of the formula RX, wherein R is a hydrocarbon radical of from 1–8 carbon atoms and X is halogen.

19. The process of claim 18 wherein RX is methyl iodide.

20. The process of claim 18 wherein RX is benzyl chloride.

21. The process of claim 10 conducted at a temperature of $-50°$ to $+50°$ C. and a pressure of up to 10 atmospheres.

References Cited in the file of this patent

UNITED STATES PATENTS 2,887,378 Williams _____ May 19, 1959

OTHER REFERENCES

Schmidt et al.: Chem. Abstracts, volume 52, column 8789 (1958).